United States Patent
Hanna et al.

(10) Patent No.: US 8,020,899 B2
(45) Date of Patent: Sep. 20, 2011

(54) PVC PIPE COUPLING

(75) Inventors: Thom M. Hanna, Evergreen, CO (US);
James E. Valliere, Toms River, NJ (US);
Thomas L. Hennemann, Cottage Grove, MN (US)

(73) Assignee: Johnson Screens, Inc., Houston, TX (US)

( * ) Notice: Subject to any disclaimer, the term of this patent is extended or adjusted under 35 U.S.C. 154(b) by 368 days.

(21) Appl. No.: 12/165,753

(22) Filed: Jul. 1, 2008

(65) Prior Publication Data

US 2010/0001520 A1    Jan. 7, 2010

(51) Int. Cl.
*F16L 21/00* (2006.01)
(52) U.S. Cl. ......................... 285/417; 285/333
(58) Field of Classification Search .................. 285/417, 285/390, 399, 369, 374, 355, 133.4, 333
See application file for complete search history.

(56) References Cited

U.S. PATENT DOCUMENTS

| | | | | |
|---|---|---|---|---|
| 2,289,271 A * | 7/1942 | Kane et al. | ...... | 285/333 |
| 2,366,067 A * | 12/1944 | Smith | ...... | 285/107 |
| 2,933,428 A * | 4/1960 | Mueller | ...... | 228/114.5 |
| 3,245,701 A * | 4/1966 | Leopold, Jr. et al. | ...... | 285/369 |
| 3,614,137 A * | 10/1971 | Jacobson | ...... | 285/390 |
| 3,658,368 A * | 4/1972 | Hokanson | ...... | 285/355 |
| 3,784,239 A * | 1/1974 | Carter et al. | ...... | 285/355 |
| 4,014,568 A * | 3/1977 | Carter et al. | ...... | 285/356 |
| 4,093,280 A * | 6/1978 | Yoshizawa et al. | ...... | 285/390 |
| 4,146,254 A * | 3/1979 | Turner et al. | ...... | 285/351 |
| 4,154,466 A * | 5/1979 | Simmons | ...... | 285/355 |
| 4,238,059 A * | 12/1980 | Caraway et al. | ...... | 285/417 |
| 4,537,426 A * | 8/1985 | Carter, Sr. | ...... | 285/423 |
| 4,682,797 A * | 7/1987 | Hildner | ...... | 285/355 |
| 5,056,831 A * | 10/1991 | Ho | ...... | 285/355 |
| 5,152,557 A * | 10/1992 | Dierickx | ...... | 285/369 |
| 5,437,481 A * | 8/1995 | Spears et al. | ...... | 285/330 |
| 5,582,439 A * | 12/1996 | Spears | ...... | 285/390 |
| 6,305,723 B1 * | 10/2001 | Schutz et al. | ...... | 285/355 |
| 6,666,480 B2 | 12/2003 | Haney | | |
| 7,017,951 B2 * | 3/2006 | Spears | ...... | 285/390 |
| 7,237,810 B2 * | 7/2007 | Hollingsworth et al. | ...... | 285/390 |
| 7,261,326 B2 | 8/2007 | Haney | | |
| 7,425,024 B2 | 9/2008 | Haney | | |
| 7,470,383 B2 | 12/2008 | Haney | | |
| 7,690,699 B2 * | 4/2010 | Smahl | ...... | 285/417 |

\* cited by examiner

*Primary Examiner* — David E Bochna
(74) *Attorney, Agent, or Firm* — John C. Cave; Gunn, Lee & Cave

(57) ABSTRACT

A threaded coupling for connecting a threaded first connecting drop pipe to a second connecting drop pipe. The coupling has a first female end having an enlarged exterior diameter and an interior diameter defining a lead in section which provides strength to resist lateral forces exerted on the threaded drop pipe connection. Adjacent the lead in section, internal threads are located in the first female end of the coupling. A second female end having an interior diameter substantially the same size as the lead in section of the first female end is located adjacent the internal threads, opposite the first female end. A male connecting end of a first connecting drop pipe having external threads is inserted into the lead in section and screwed into the coupling. A male connecting end of a second connecting drop pipe is coated with an adhesive and inserted into the second female end.

8 Claims, 6 Drawing Sheets

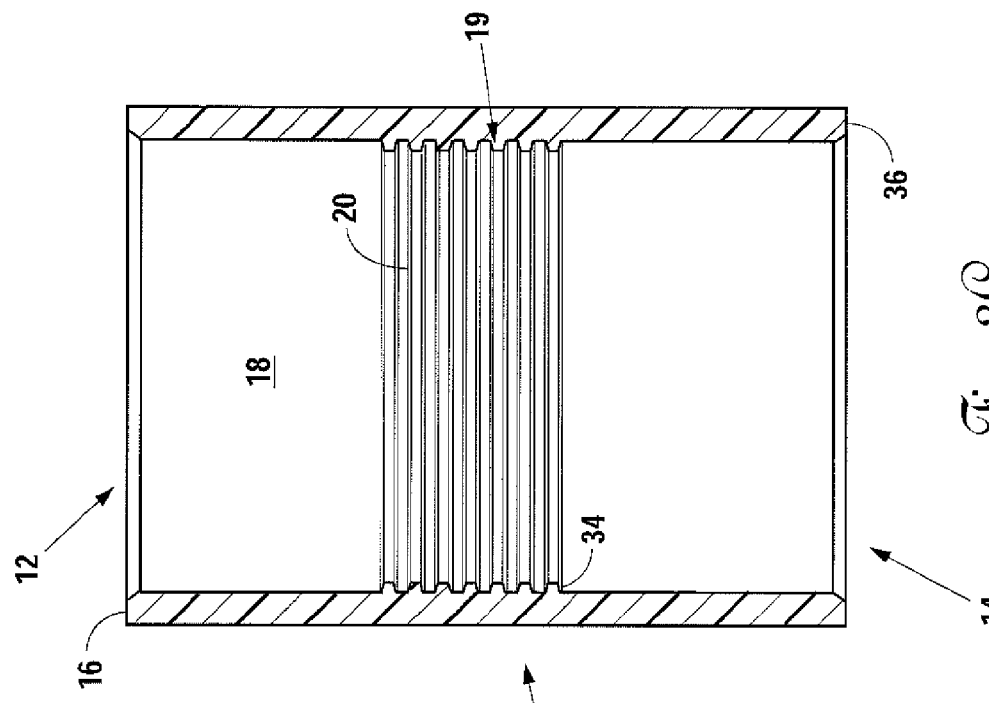
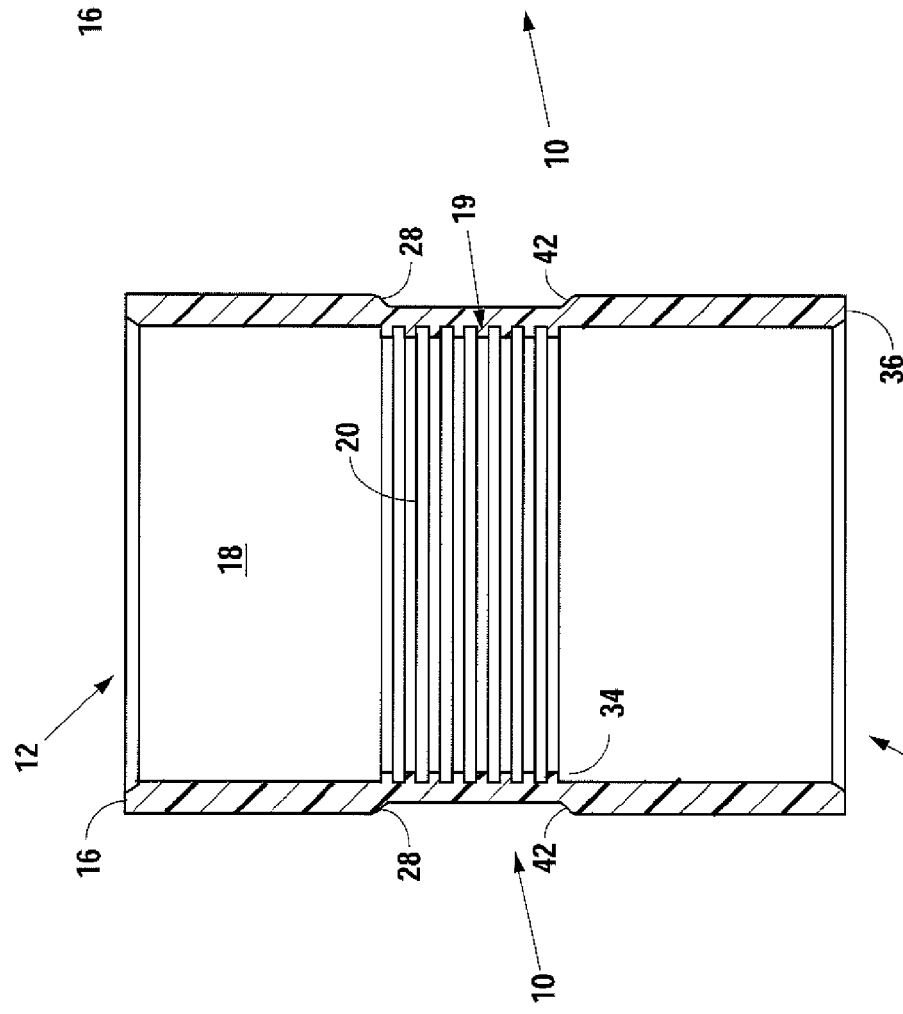

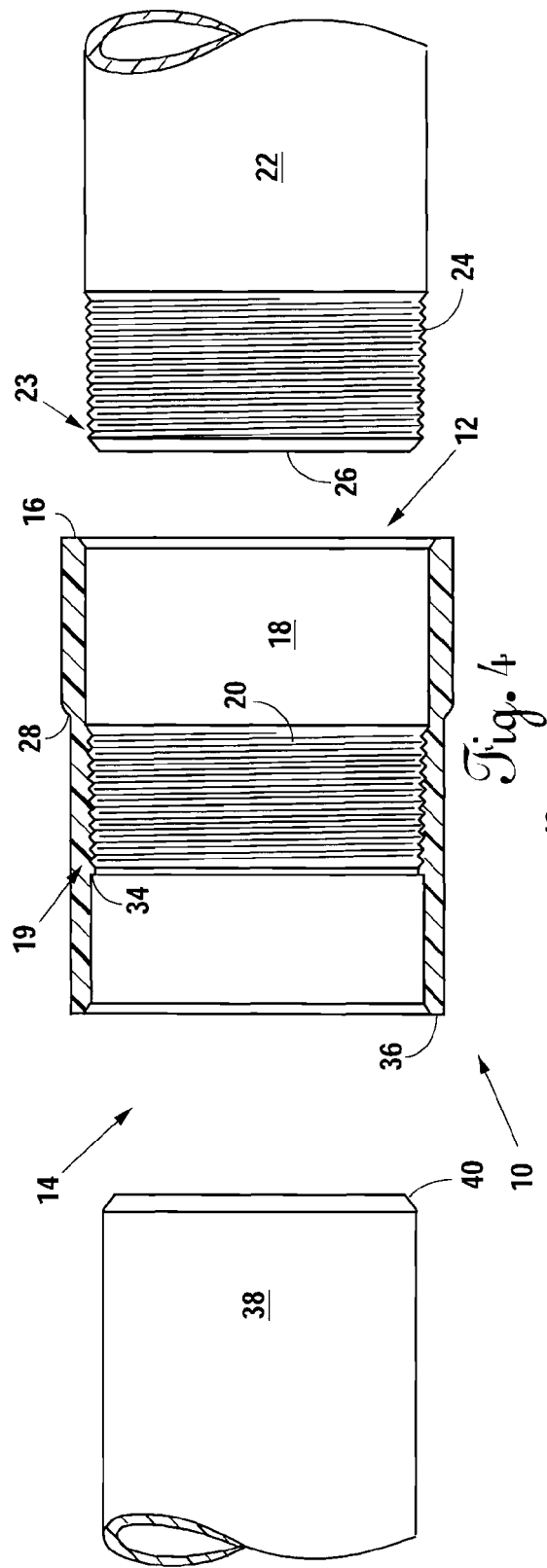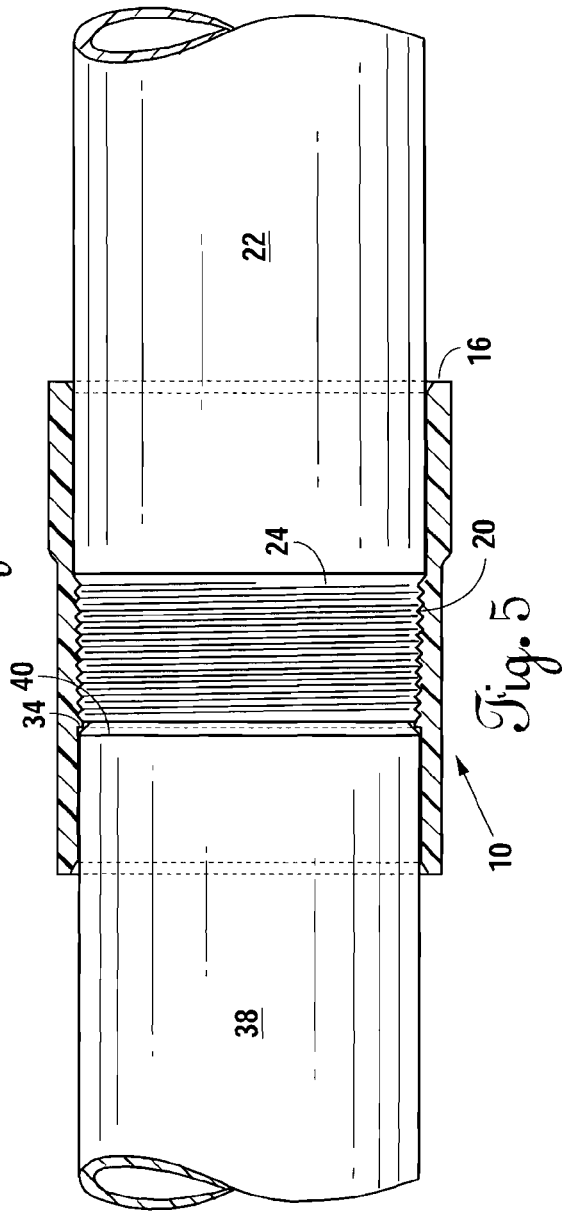

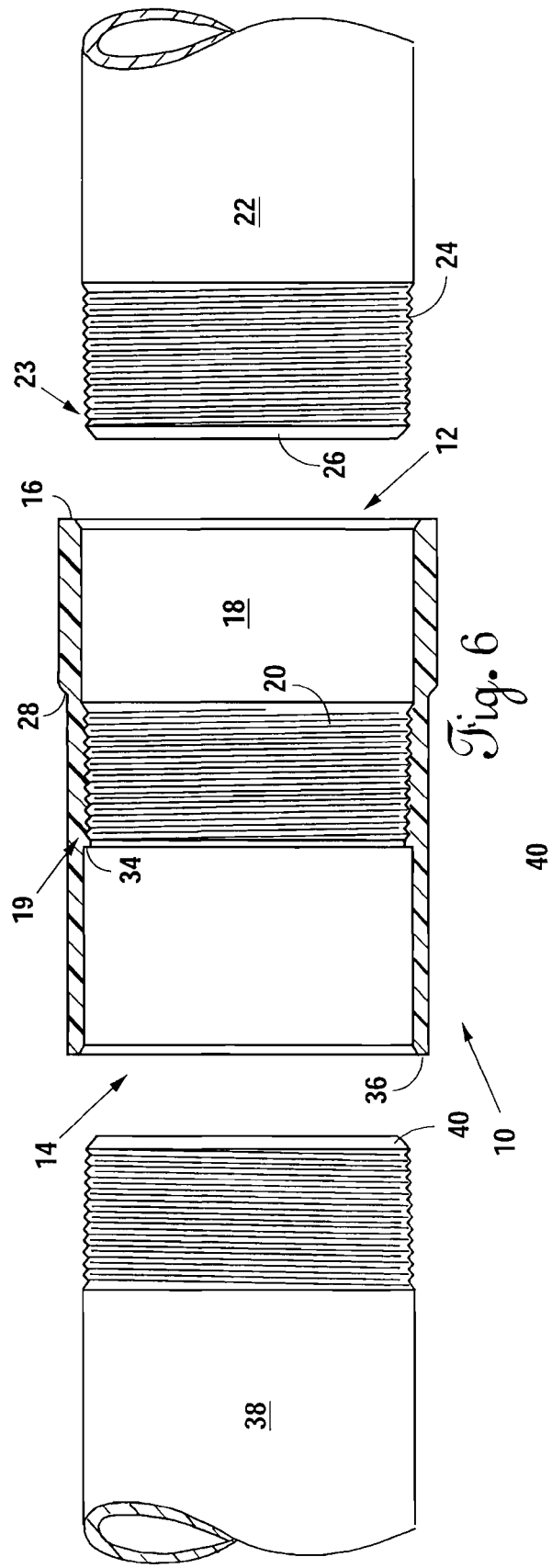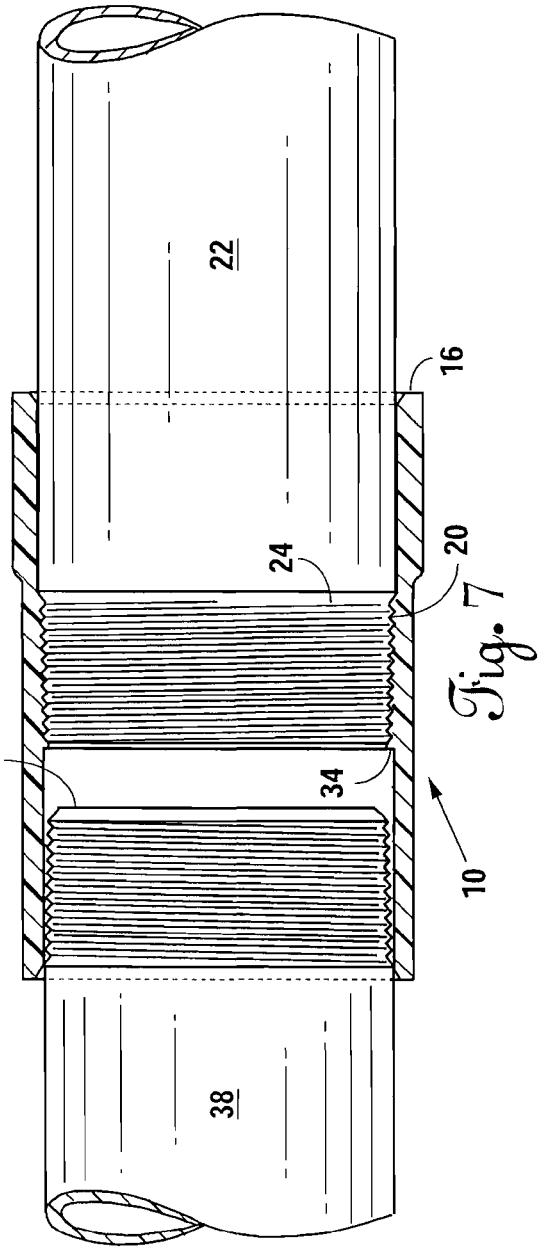

PVC PIPE COUPLING

BACKGROUND OF THE INVENTION

1. Field of the Invention

The present invention relates generally to submersible pump drop pipe. More specifically, the preferred embodiment of the present invention relates to a coupling with an internally threaded portion to threadably receive one end of an externally threaded male drop pipe, and an internally non-threaded portion for receiving a non-threaded male end of a drop pipe. Using the coupling of the present invention, it is possible to connect a threaded submersible pump drop pipe to a non-threaded submersible pump drop pipe and obtain the advantages of the coupling as described herein. Further, alternative embodiments of the present invention also enable connection between two externally threaded male ends of submersible drop pipe.

2. Description of the Related Art

In water well systems, a casing pipe is inserted into the well to maintain the integrity of the well sidewalls. Once the integrity is secure, a submersible pump is placed in the well for pumping water to the surface. Attached to the pump is a drop pipe, which is the conduit that carries water from within the well to the surface. It is important in this system that the drop pipe does not leak.

For years, pipes have been joined together with couplings and sealed with an adhesive such as cement or "pipe dope" to prevent disjoinder and leaking. This practice is still used today. More recently, threaded drop pipe has been used. In fact, the most common type of drop pipe on the market today is drop pipe that has external male threads on both connecting ends. Sections of such male threaded drop pipes are connected by internally threaded female couplings.

Even more recently, drop pipe with better connections has emerged in the industry. The superior drop pipe has a female end with internal threads and a lead in section and a male end with external threads. U.S. Pat. Nos. 6,666,480 and 7,261,326 to Haney et al. are examples of this type of pipe. The male end of a first drop pipe is threaded into the female end of a second drop pipe thus eliminating the need for a coupling altogether. The advantage of the male/female threaded drop pipe is that it allows the driller to run one pipe into the well, align and screw in the next pipe with the use of only minimal amounts of pipe dope, if any, for ease of turning. Furthermore, the lead in section of the male/female threaded drop pipe provides lateral strength that is not present in traditional non-threaded drop pipe connections. The added lateral strength allows the junction of two sections of drop pipe to resist lateral forces applied to the pipe, aiding in the prevention of leaks.

Whether installing new systems or replacing damaged old ones, because the male/female threaded drop pipe offers significant advantages over traditional drop pipe, those skilled in the art seek to use it when possible. However, when replacing existing sections of drop pipe already in place, the differing types of drop pipe previously used in the industry creates a compatibility problem. If one desires to change the drop pipe in a well from the standard non-threaded drop pipe joined together by a non-threaded coupling to the male/female threaded drop pipe, the entire line of drop pipe must be replaced, resulting in an expensive conversion. Yet, a complete conversion may not be required or desired where there is only a portion or section of drop pipe that needs replacement. A similar problem is encountered if one wants to convert male threaded drop pipe joined together by a threaded coupling to the male/female threaded drop pipe.

It is therefore desirable to provide a coupling that provides the advantages of the male/female threaded drop pipe and the advantage of only requiring replacement of a desired section of the line of drop pipe in a well. It is also desirable to provide a coupling that is capable of connecting a male/female threaded drop pipe to a non-threaded drop pipe. It is a further object of the present invention to provide a coupling that is capable of connecting a male threaded drop pipe to a male/female threaded drop pipe.

BRIEF SUMMARY OF THE INVENTION

The coupling of the present invention provides the advantages of the male/female threaded drop pipe without the burden of having to replace the entire line of drop pipe in a well by enabling the connection of traditional, non-threaded drop pipe to the male end of male/female threaded drop pipe. The coupling of the present invention has a first female end for receiving an externally threaded male drop pipe. The first female end of the coupling is defined by a lead in section that has an enlarged exterior diameter and an interior diameter that is of sufficient size to receive a threaded male end portion of a first connecting drop pipe with minimal clearance. The lead in section is non-threaded and it aligns and directs the externally threaded male end portion of the first connecting drop pipe into the coupling, to the corresponding internal female threads of the coupling.

Internal female threads corresponding to the external male threads of the first connecting drop pipe are positioned adjacent the lead in section of the coupling. The external threads on the first connecting drop pipe are screwed into and engage the corresponding female threads of the coupling, creating a watertight seal. In addition, the lead in section of the coupling is of sufficient length to provide lateral strength to resist lateral forces exerted on the connection of the first connecting drop pipe and the coupling of the present invention.

A second female end of the coupling is located opposite the first female end and is adjacent the internal threads of the first female end. The second female end has an interior diameter that is substantially the same as the interior diameter of the lead in section of the first female end and is of sufficient size to receive the exterior diameter of a second connecting drop pipe therein with minimal clearance. The internal surface of the second female end is non-threaded. A stop collar or shoulder is disposed within the coupling to prevent the second connecting drop pipe from interfering with the internal threads of the first female end. The second female end also extends a length sufficient to provide lateral strength to resist any lateral forces exerted on the second connecting drop pipe and the coupling.

BRIEF DESCRIPTION OF THE DRAWINGS

FIG. 4 is a sectional side view of the preferred embodiment for the coupling of the present invention with a threaded first connecting male drop pipe and a non-threaded second connecting drop pipe.

FIG. 5 is a sectional side view of the preferred embodiment for the coupling of the present invention showing the threaded first connecting male drop pipe engaged in the coupling and a non-threaded second connecting drop pipe inserted in the coupling.

FIG. 6 is a sectional side view of an alternative embodiment for the coupling of the present invention with a threaded first connecting male drop pipe and a threaded second connecting drop pipe.

FIG. 7 is a sectional side view of an alternative embodiment for the coupling of the present invention showing the threaded first connecting male drop pipe engaged in the coupling and a threaded second connecting drop pipe partially inserted in the coupling.

DETAILED DESCRIPTION OF THE INVENTION

Figure 1:
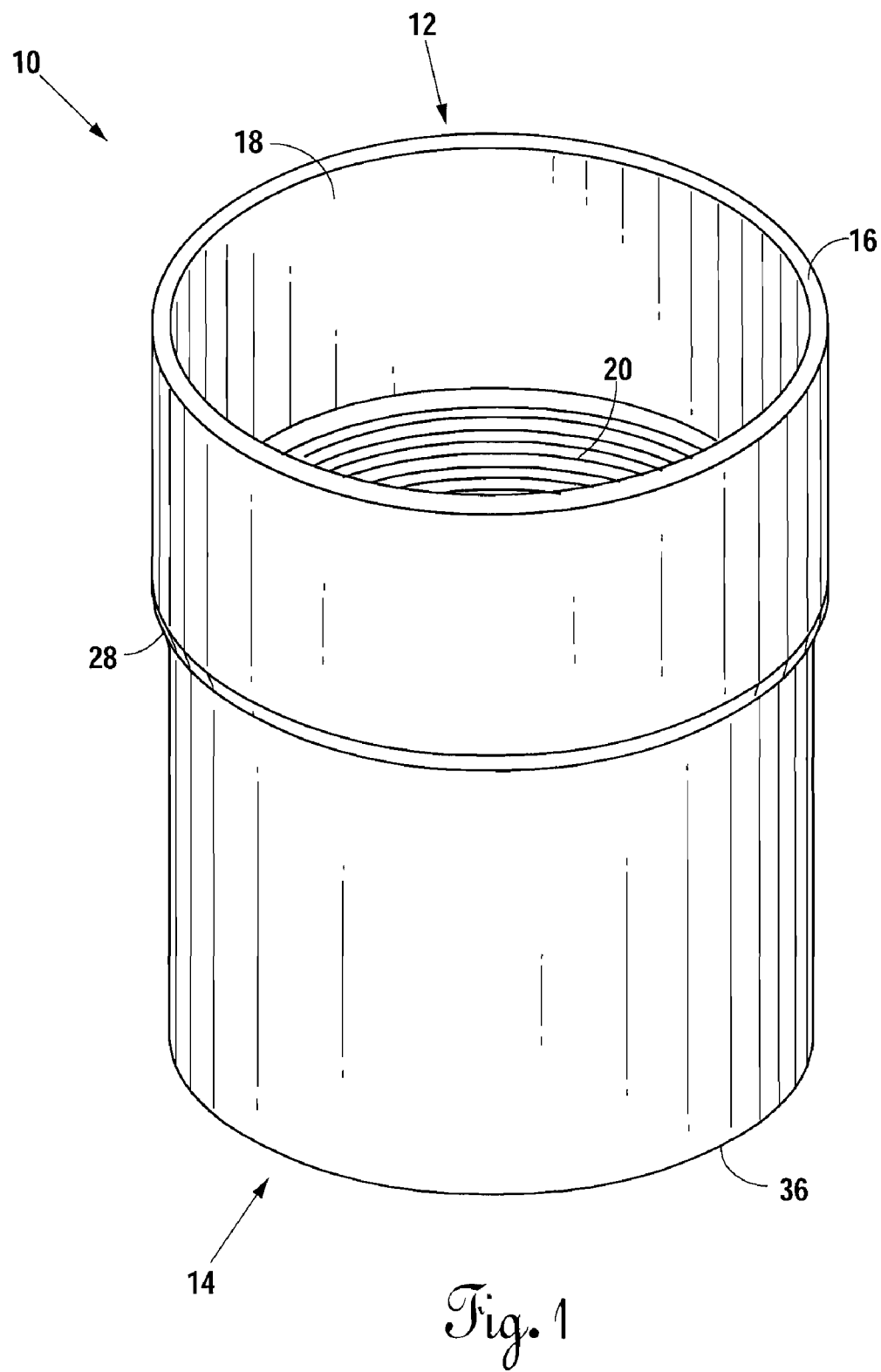
FIG. 1 is a perspective view of the coupling of the present invention.

Referring to FIGS. 1 through 5, the coupling 10 of the present invention is disclosed. The coupling 10 has a first female end 12 and a second female end 14. Referring to FIGS. 1 through 3A, first female end 12 terminates at first leading edge 16 and second female end 14 terminates at second leading edge 36. First leading edge 16 faces the opposite direction of second leading edge 36. The first female end 12 has a lead in section 18 that is non-threaded and an internally threaded section 19 between the lead in section 18 and the second female end 12. The interior surface of the lead in section 18 terminates at the internal threads 20 of the internally threaded section 19.

Referring to FIGS. 1, 2 4, and 5, lead in section 18 has an interior diameter 18a that is large enough to receive a male end 23 of a first connecting drop pipe 22 having external threads 24. In the preferred embodiment, lead in section 18 is belled and has an enlarged exterior diameter 18b (as compared to the exterior diameter of the rest of the coupling) which forms a shoulder 28 on the exterior surface of the coupling 10 and a thickened coupling wall.

Referring to FIGS. 4 and 5, lead in section 18 aids in aligning and directing the male end 23 of the first connecting drop pipe 22 to the corresponding internal threads 20 of the coupling 10. Lead in section 18 is of sufficient length to provide lateral strength to the connection between the first connecting drop pipe 22 and the coupling 10 to resist lateral forces exerted on the first connecting drop pipe 22, thereby aiding in maintaining the integrity of the connection and a watertight seal. In the preferred embodiment, the length of the lead in section 18 is long enough so that, before the external threads 24 of the first connecting drop pipe 22 engage the internal threads 20 of the coupling 10, lead in section 18 covers most, if not all, of the external threads 24, which engage the internal threads 20 of the coupling 10 at wrench tight.

External threads 24 are preferably NPT (American National Standard Taper Pipe Threads) male threads and are intended to be threaded into internal threads 20 to provide the watertight connection. Internal threads 20 are also preferably NPT female threads. NPT threads are typically triangular with flat crests and roots. However, it is anticipated that triangular threads, square threads, or other thread profiles might also be utilized.

Still referring to FIGS. 4 and 5, it is preferable that the internal threads 20 slightly taper toward the second female end 14, and external threads 24 of first connecting drop pipe 22 slightly taper toward a bevel 26 at the leading edge of the male end 23. When connecting the first connecting drop pipe 22 to coupling 10, bevel 26 and external threads 24 pass through lead in section 18 to internal threads 20. Coupling 10 and first connecting drop pipe 22 are then screwed together, causing external threads 24 to engage internal threads 20 to provide a watertight seal. There is a sufficient number of internal threads 20 and external threads 24 so that a watertight seal is created when the first connecting drop pipe 22 is screwed into the coupling 10.

Second female end 14 of coupling 10 is positioned so that second leading edge 36 faces the opposite direction of first leading edge 16 of first female end 12. Second female end 14 has a generally smooth cylindrical interior surface with a substantially uniform interior diameter and a generally smooth cylindrical exterior surface with a substantially uniform exterior diameter. As shown in FIGS. 4 and 5, the interior diameter of the second female end 14 is sufficient to receive a second connecting drop pipe 38 with minimal clearance. In the preferred embodiment, the interior diameter 18a of the lead in section 18 and the interior diameter of the second female end 14 are substantially the same. However, it is anticipated that the interior diameter of the second female end 14 could be modified to accommodate various sizes of second connecting drop pipes.

As shown in FIGS. 3A through 3D, and FIGS. 4 through 7, an interior shoulder or stop collar 34 is positioned on the interior surface of the coupling 10 between the second female end 14 and the internal threads 20. The stop collar 34 extends around the interior circumference of the coupling 10 and has sufficient width to prevent the second connecting drop pipe 38 from interfering with the internal threads 20 when the second connecting drop pipe 38 is inserted into the second female end 14.

Referring to FIG. 5, when the second connecting drop pipe 38 is fully inserted into the second female end 14, the interior surface of the second female end 14 has sufficient length to provide a secure watertight connection and to provide enough tensile strength for resisting normal tensile forces on drop pipe connections. Preferably, the connection between the second connecting drop pipe 38 and the coupling 10 will withstand tensile forces commonly encountered for PVC drop pipe and have a water pressure rating as required by ASTM D1785-05. However, it is anticipated that other embodiments of this invention may not meet these standards. The length of the interior surface of the second female end 14 is also sufficient to provide lateral strength.

In most instances, the second connecting drop pipe 38 will have a non-threaded exterior surface and will be joined to coupling 10 by applying an adhesive such as cement or pipe dope (not shown) to the outer surface at the connecting end of the second connecting drop pipe 38 and/or the interior surface of the second female end 14. After applying the cement or pipe dope, the second connecting drop pipe 38 is inserted into the second female end 14 to create a watertight seal. Preferably, second connecting drop pipe 38 slides within second female end 14 until its leading edge 40 meets stop collar 34.

Figures 2, 3A:
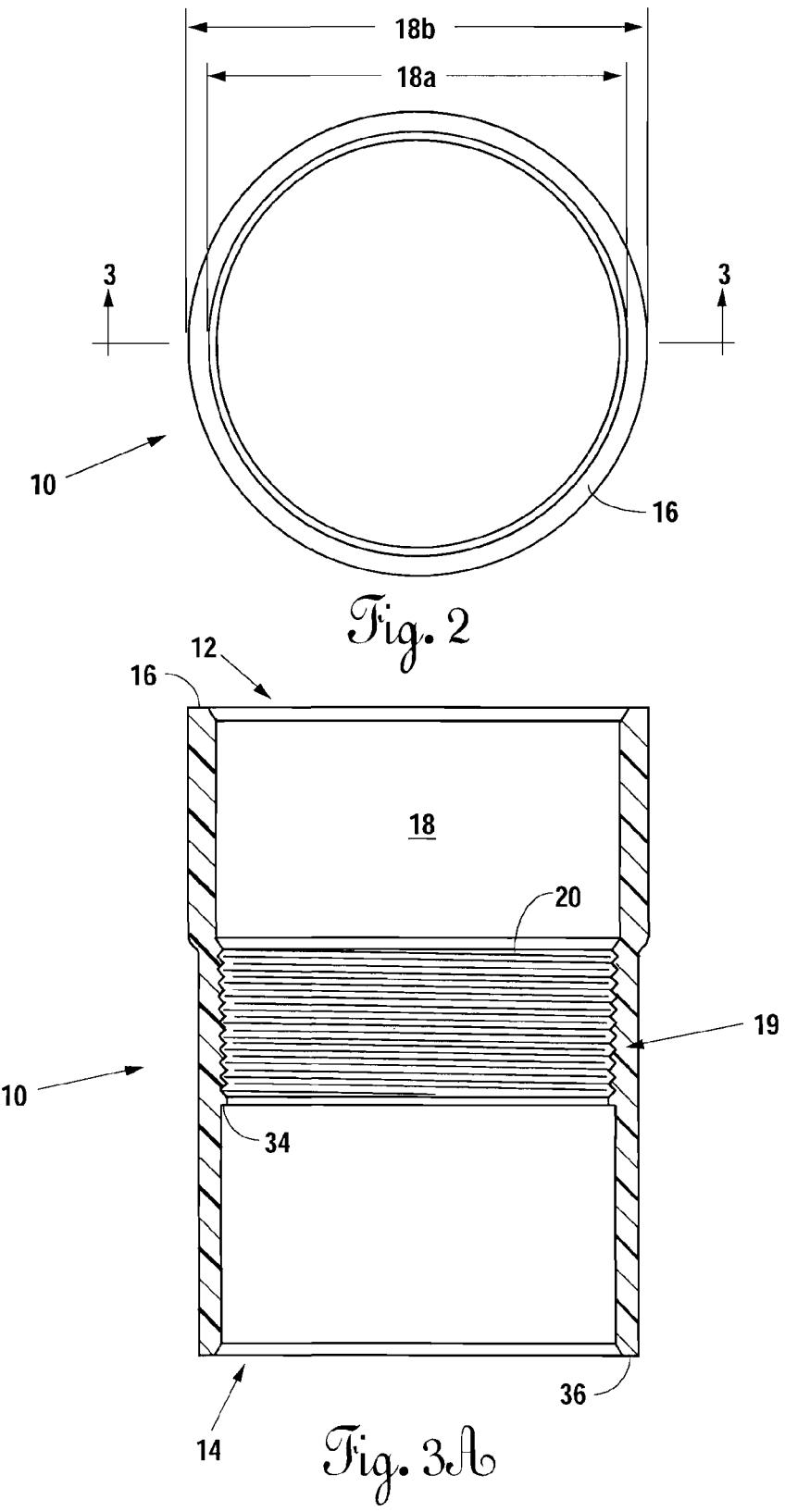
FIG. 2 is an end view of the preferred embodiment for coupling of the present invention.
FIG. 3A is a sectional side view of the preferred embodiment for the coupling of the present invention along line 3-3 of FIG. 2, showing an enlarged exterior diameter at the first female end.

FIG. 3A shows the preferred embodiment of the second female end 14. As shown, the coupling wall at the second female end 14 in the preferred embodiment is not belled. Instead, the exterior diameter of the coupling wall at the internally threaded section 19 and the exterior diameter of the coupling wall at the second female end 14 are substantially the same. In contrast, the exterior diameter of the coupling 10 at lead in section 18 of the first female end 12 is belled, providing for a thickened coupling wall.

FIG. 3B discloses an alternative embodiment of the coupling 10 of the present invention in which the second female end 14 is also belled. This belling provides for an enlarged exterior diameter and a thickened coupling wall at the second female end 14. Preferably, in this embodiment, the enlarged exterior diameter of the second female end 14 is substantially the same size as the exterior diameter of the lead in section 18 at the first female end 12. The thickened coupling wall of the second female end 14 forms a second shoulder 42 on the exterior surface of the coupling 10 at the juncture of the thickened coupling wall of the second female end 14 and the coupling wall at the internally threaded section 19. The thickened coupling wall of this embodiment adds strength to the connection for resistance against both tensile and lateral forces exerted on the second connecting drop pipe 38, thereby aiding in maintaining a watertight seal.

Referring to FIG. 3C, another alternative embodiment for the coupling 10 of the present invention is disclosed. In this embodiment, neither the lead in section 18 nor the second female end 14 is belled and the exterior diameter of the coupling 10 is substantially uniform along the length of the coupling 10. Otherwise, the design of this alternative embodiment is the same as the preferred embodiment.

Figure 3D:
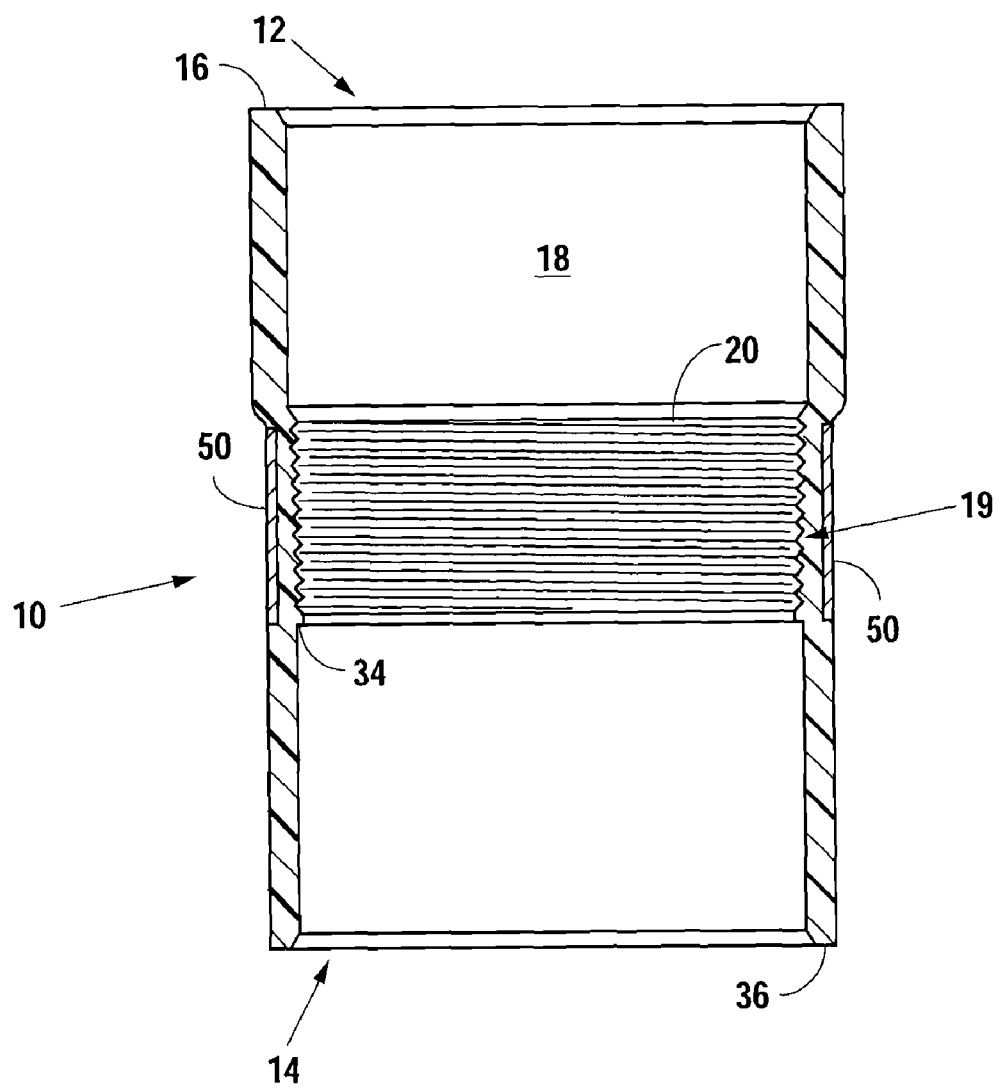
FIG. 3B is a sectional side view of an alternative embodiment for the coupling of the present invention along line 3-3 of FIG. 2, showing a second enlarged exterior diameter at the second female end.
FIG. 3C is a sectional side view of an alternative embodiment for the coupling of the present invention along line 3-3 of FIG. 2, showing the coupling as having a uniform exterior diameter.

Referring to FIG. 3D, another alternative embodiment for coupling 10 of the present invention is disclosed. In this embodiment, a metal reinforcement ring is placed in the coupling wall at the internally threaded section 19. Although FIG. 3B shows the reinforcement ring 50 placed in the preferred embodiment of the coupling of FIG. 3A, it is anticipated that the reinforcement ring 50 could be placed in the coupling wall at the internally threaded section 19 of each of the embodiments shown in FIGS. 3B and 3C. The reinforcement ring 50 served to prevent cracking of the coupling wall at the internally threaded section 19. This cracking, which is commonly caused by hoop stresses due to over tightening, can commonly occur in injection molded plastic couplings.

It is anticipated that the second connecting drop pipe 38 will usually have a non-threaded, smooth exterior surface at its connecting end. However, in some instances it is also anticipated the second connecting drop pipe 38 will have external threads at its connecting end, as shown in FIGS. 6 and 7. It is intended that an alternative embodiment of the present invention will be capable of being joined to a second connecting drop pipe 38 having external threads at its connecting end. In this alternative embodiment, the second female end 14 has sufficient length to cover all of the externally threaded portion of the second connecting drop pipe 38 as well as an additional non-threaded portion of the second connecting drop pipe 38 when the second connecting drop pipe 38 is fully inserted into the second female end 14. In this alternative embodiment of the coupling 10, the interior surface of the second female end 14 adjacent the non-threaded portion of the second connecting drop pipe 38 is long enough to provide tensile strength and a watertight connection when the second connecting drop pipe 38 is fully inserted. It should be noted that this alternative embodiment could apply to the embodiments shown FIGS. 3A, 3B, and 3C.

Coupling 10 is shown as connecting a second connecting drop pipe 38 and a threaded first connecting drop pipe 22 that have substantially the same interior diameters. However, in alternative embodiments, coupling 10 could actually be a reducer, wherein second female end 14 is significantly smaller or larger in interior diameter than first female end 12, thereby allowing the connection of a threaded first connecting drop pipe 22 to a second connecting drop pipe 38 which is smaller or larger, respectively, than the threaded first connecting drop pipe 22.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

We claim:

1. A coupling for connecting a male end of a first connecting polyvinyl chloride (PVC) drop pipe that has external threads disposed thereon to a second connecting PVC drop pipe, said coupling comprising:
   a substantially cylindrical first female end with a non-threaded lead in section and an internally threaded section adjacent said lead in section;
   said internally threaded section having internal threads for mating with said external threads on said male end of said first connecting PVC drop pipe;
   said lead in section being of sufficient length to provide lateral strength when said first connecting PVC drop pipe is connected;
   said lead in section having an enlarged interior diameter as compared to the interior diameter at the crests of the internal threads of said internally threaded section, wherein said interior diameter is slightly larger than the external diameter of said male end of said first connecting PVC drop pipe;
   said lead in section terminating in a first leading edge;
   said lead in section having an enlarged exterior diameter relative to the exterior diameter of said internally threaded section;
   an interior diameter at the radially innermost portion of said first leading edge which is substantially equal to the interior diameter of said lead in section adjacent said internally threaded section;
   a substantially cylindrical, non-threaded second female end adjacent said internally threaded section and opposite said first female end; and
   said second female end having an interior diameter that is slightly larger than the external diameter of said second connecting PVC drop pipe.

2. The coupling as recited in claim 1 wherein said coupling further comprises a thickened coupling wall at said lead in section of said first female end relative to the coupling wall at said internally threaded section of said first female end.

3. The coupling as recited in claim 1 wherein the exterior diameter of said second female end is enlarged relative to the exterior diameter of said internally threaded section of said first female end.

4. The coupling as recited in claim 3 wherein said coupling comprises a thickened coupling wall at said second female end relative to the coupling wall at said internally threaded section of said first female end.

5. The coupling as recited in claims 1, 2 or 3 further comprising a reinforcement ring in the coupling wall at said internally threaded section.

6. The coupling as recited in claim 5 wherein said reinforcement ring is metal.

7. A coupling for connecting a male end of a first connecting polyvinyl chloride (PVC) drop pipe that has external threads disposed thereon to a second connecting PVC drop pipe, said coupling comprising:

a substantially cylindrical first female end with a non-threaded lead in section and an internally threaded section adjacent said lead in section;

said internally threaded section having internal threads for mating with said external threads on said male end of said first connecting PVC drop pipe;

said coupling comprising a reinforcement ring in the coupling wall at said internally threaded section;

said lead in section being of sufficient length to provide lateral strength when said first connecting PVC drop pipe is connected;

said lead in section having an enlarged interior diameter as compared to the interior diameter at the crests of the internal threads of said internally threaded section, wherein said interior diameter is slightly larger than the external diameter of said male end of said first connecting PVC drop pipe;

said lead in section terminating in a first leading edge;

an interior diameter at the radially innermost portion of said first leading edge which is substantially equal to the interior diameter of said lead in section adjacent said internally threaded section;

a substantially cylindrical, non-threaded second female end adjacent said internally threaded section and opposite said first female end; and said second female end having an interior diameter that is slightly larger than the external diameter of said second connecting PVC drop pipe.

8. The coupling as recited in claim 7 wherein said reinforcement ring is metal.

* * * * *